(12) United States Patent
Bannai et al.

(10) Patent No.: US 8,701,161 B1
(45) Date of Patent: Apr. 15, 2014

(54) SYSTEMS AND METHODS FOR DETECTING NETWORK INTRUSION DEVICES

(75) Inventors: Vinay Kumar Bannai, Sunnyvale, CA (US); Henrik Boggild Kristensen, Sunnyvale, CA (US); Sohail Mallick, Fremont, CA (US); Jacqueline M. Zoucha, Sunnyvale, CA (US); Raja Narayan, Sunnyvale, CA (US); Curtis W. Dodd, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 13/538,919

(22) Filed: Jun. 29, 2012

(51) Int. Cl.
*H04L 29/06* (2006.01)

(52) U.S. Cl.
USPC ............ 726/3; 380/255; 380/256; 380/258

(58) Field of Classification Search
USPC ............................................................ 726/3
See application file for complete search history.

(56) References Cited

U.S. PATENT DOCUMENTS

| | | | | |
|---|---|---|---|---|
| 4,217,488 A * | 8/1980 | Hubbard | ............. | 398/40 |
| 4,435,850 A * | 3/1984 | Bowen et al. | ............. | 398/40 |
| 4,538,140 A | 8/1985 | Prestel | | |
| 4,605,922 A * | 8/1986 | Blattman et al. | ............. | 340/552 |
| 5,093,568 A * | 3/1992 | Maycock | ............. | 250/227.14 |
| 5,274,488 A * | 12/1993 | Udd | ............. | 398/152 |
| 5,825,516 A | 10/1998 | Walsh | | |
| 6,046,797 A | 4/2000 | Spencer et al. | | |
| 6,122,044 A | 9/2000 | Gautheron et al. | | |
| 6,476,952 B1 * | 11/2002 | Snawerdt | ............. | 398/141 |
| 7,126,678 B2 | 10/2006 | Fayolle et al. | | |
| 7,280,188 B2 | 10/2007 | Schmuck et al. | | |
| 7,317,874 B2 | 1/2008 | Li et al. | | |
| 7,440,701 B2 | 10/2008 | Li et al. | | |
| 7,450,848 B2 | 11/2008 | Li et al. | | |
| 7,493,042 B2 | 2/2009 | Li et al. | | |
| 7,570,843 B2 | 8/2009 | Miyazaki et al. | | |
| 8,000,601 B2 | 8/2011 | Schofield et al. | | |
| 2005/0180315 A1 | 8/2005 | Chitrapu et al. | | |
| 2006/0156009 A1 | 7/2006 | Shin et al. | | |
| 2009/0148159 A1 * | 6/2009 | Schofield et al. | ............. | 398/40 |
| 2009/0257743 A1 | 10/2009 | Chung et al. | | |

(Continued)

FOREIGN PATENT DOCUMENTS

| | | |
|---|---|---|
| EP | 1748580 A1 | 7/2005 |
| EP | 1884758 A1 | 3/2006 |

(Continued)

OTHER PUBLICATIONS

Fuse et al., Development of an Ultra High-secure and 1 Gbps Optical Transmission System Using Quantum Noise Diffusion Cryptography, Sep. 2005, 31st European Conference on Optical Communication, ECOC 2005, vol. 3, pp. 555-556.*

(Continued)

*Primary Examiner* — David Pearson
*Assistant Examiner* — Kenneth Chang
(74) *Attorney, Agent, or Firm* — Maynard, Cooper & Gale, P.C.; Jon E. Holland

(57) ABSTRACT

An optical communication system has a transmitter that generates an optical signal containing payload data and security data. The transmitter double modulates an optical signal where payload data is in-band and security data is out-of-band. If a man-in-the-middle attack occurs and the intrusion device is unable to detect the out-of-band signal, the intrusion device will not replicate the out-of-band signal thereby allowing the presence of the intrusion device to be detected.

14 Claims, 6 Drawing Sheets

(56) References Cited

U.S. PATENT DOCUMENTS

| | | |
|---|---|---|
| 2010/0088766 A1 | 4/2010 | Michaely et al. |
| 2011/0043806 A1* | 2/2011 | Guetta et al. .................. 356/432 |
| 2011/0135074 A1* | 6/2011 | McNaughton et al. .... 379/93.02 |
| 2011/0175568 A1* | 7/2011 | Leijssen et al. ............... 320/108 |
| 2012/0076301 A1* | 3/2012 | Kanter .......................... 380/256 |

FOREIGN PATENT DOCUMENTS

| | | |
|---|---|---|
| EP | 1901448 A1 | 9/2006 |
| EP | 1986350 A1 | 4/2007 |
| EP | 1524781 B1 | 10/2007 |

OTHER PUBLICATIONS

Sischka, et al., "Complimentary Correlation Optical Time-Domain Reflectometry—in respect to the HP 8145A Optical Time-Domain Reflectometer—technical," Hewlett-Packard Journal, Dec. 1988, p. 14-21.

Takushima, et al. "In-Service OTDR for Passive Optical Networks," OSA/OFC/NFOEC, 2010.

Turner, et al, U.S. Appl. No. 12/783,999 entitled, "Systems and Methods for Unobtrusively Testing Optical Fibers," filed May 20, 2010.

\* cited by examiner

SYSTEMS AND METHODS FOR DETECTING NETWORK INTRUSION DEVICES

BACKGROUND AND RELATED ART

Optical networks are vulnerable to various types of security threats. In one type of attack, sometimes referred to as a man-in-the-middle (MITM) attack, an intruder severs a fiber connecting two nodes of the network and inserts an intrusion device that intercepts signals communicated across the fiber by the two nodes. To prevent its detection, the intrusion device may regenerate the intercepted signals so that each node continues to receive optical signals from the other node after insertion of the intrusion device in the fiber's path. In this scenario, the intrusion device could remain in the path and, hence, have unauthorized access to communicated data for long periods of time.

As optical networks become a significant element of data transfers for individuals, banks, and other data users, there is a need to protect optical networks from MITM attacks and other security threats. It is generally desirable for the circuitry for protecting optical networks from such threats to be relatively simple and inexpensive without adversely impacting the performance of the optical networks.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for protecting a communication system from a man-in-the-middle (MITM) attack on a physical layer of a communication system. An embodiment of an optical communication system of the present disclosure comprises optical communication devices coupled together via an optical fiber. One of the optical communication devices, referred to hereafter as the "transmitting device," generates an optical signal that is double-modulated for transmission to the other optical communication device, referred to hereafter as the "receiving device." The double-modulated signal contains payload information and security information. The payload information is carried by an optical data signal, and the transmitting device embeds the security information in the optical data signal by amplitude modulating the optical data signal with the security information at a level that is hidden in optical channel noise. Therefore, if an intrusion device is inserted into the fiber path, such intrusion device should be unaware of the existence of the security information and, thus, will not embed the security information in the regenerated signal. Upon receiving an optical signal from the fiber, the receiving device determines whether the security information is present. If the security information is not present, the receiving device detects a presence of an intrusion device in the fiber and notifies a system administrator or other user. The receiving device also stops using the fiber for data communication until the system administrator or other user has verified that fiber is safe of such communication.

Figure 1:
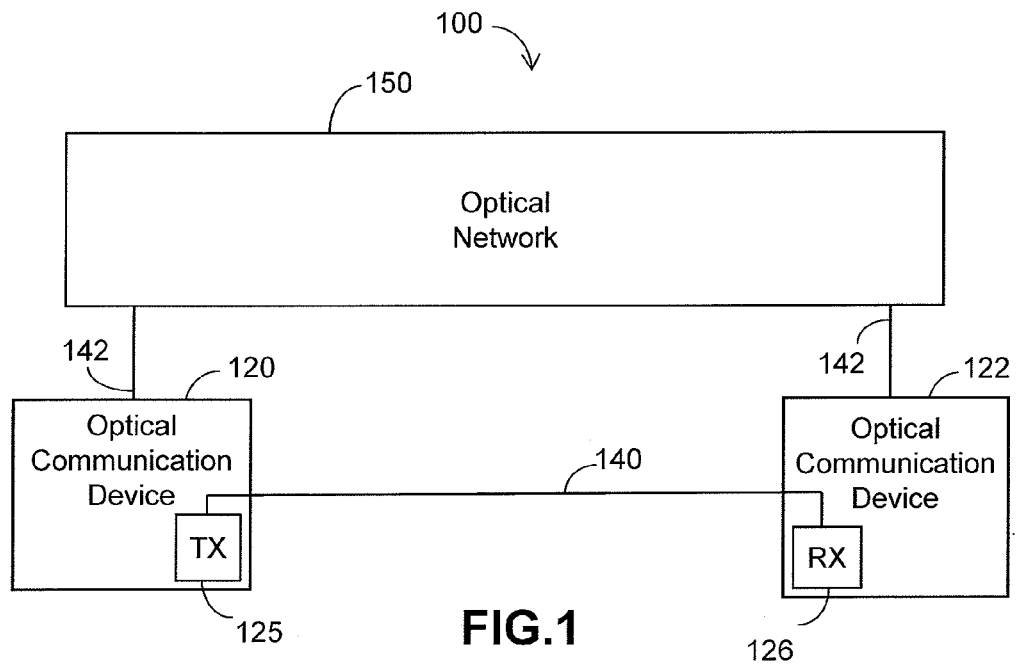
FIG. 1 is a block diagram illustrating an exemplary embodiment of an optical communication system.

FIG. 1 depicts an exemplary embodiment of an optical communication system 100, which has an optical communication device 120 coupled to an optical communication device 122 via an optical fiber 140. In one embodiment, the devices 120 and 122 are each nodes of an optical network 150, but other configurations are possible in other embodiments. During normal conditions, an optical transmitter (TX) 125 of the optical communication device 120 generates and transmits an optical signal through the optical fiber 140 to an optical receiver (RX) 126 of the optical communication device 122. Such optical signal defines payload data that is recovered by the receiver 126. In this regard, the receiver 126 converts the optical signal into an electrical signal defining the payload data that is used by the transmitter 125 to modulate an optical signal. Note that communication may occur in the opposite direction. That is, the optical communication device 122 may have a transmitter (not shown) that transmits an optical signal to a receiver (not shown) of the optical communication device 120.

Figure 2:
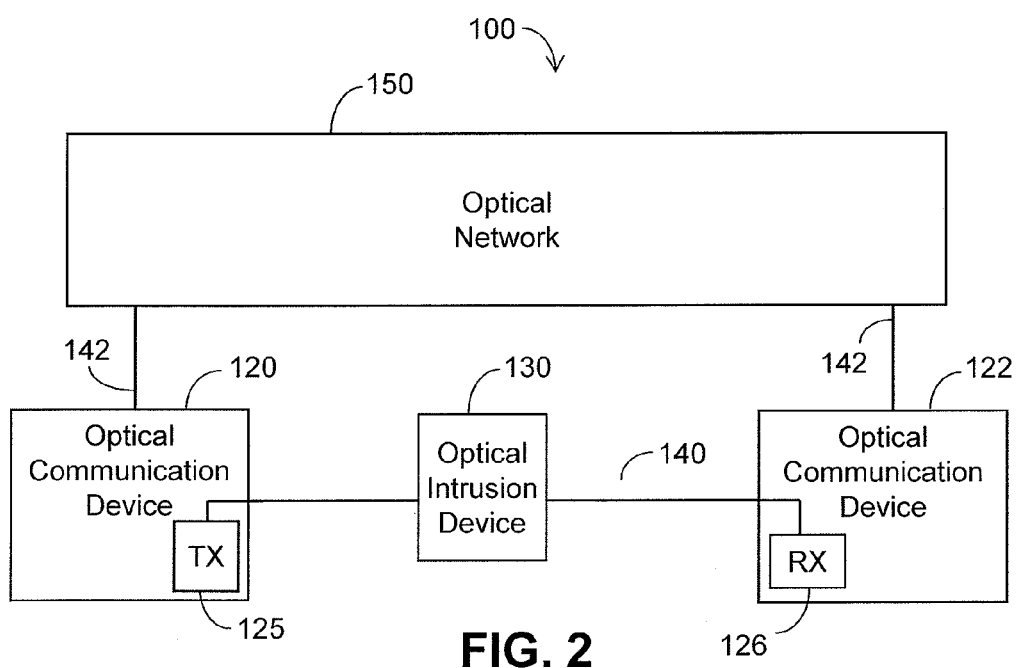
FIG. 2 is a block diagram illustrating the optical communication system of FIG. 1 after an optical intrusion device has been coupled to an optical fiber.

FIG. 2 shows the system 100 after an optical intrusion device 130 has been inserted into the fiber 140 by an intruder. In this regard, the intruder may physically break the fiber 140 into two segments and then couple an end of each segment to the optical intrusion device 130, which then intercepts the optical signals communicated across the fiber 140. For each optical signal transmitted by the transmitter 125, the intrusion device 130 converts the optical signal into an electrical signal and stores the payload data from the electrical signal thereby providing the intruder with unauthorized access to the payload data transmitted by the transmitter 125. In an effort to prevent its detection by the optical communication device 122, the intrusion device 130 attempts to regenerate the intercepted optical signal and transmit such regenerated signal across the fiber 140 to the receiver 126. The intrusion device 130 may also attempt to regenerate signals in the opposite direction in an effort to prevent the optical communication device 120 from detecting its presence.

To facilitate detection of the optical intrusion device 130, the transmitter 125 embeds security information in the optical signals transmitted by it. In one exemplary embodiment, the security information is a predefined code word that is expected by the optical communication device 122. Such code word may be a shared secret or may be derived from a shared secret that is negotiated or otherwise communicated between the optical communication devices 120 and 122. Techniques for communicating shared secrets between communication devices (e.g., encryption, public key/private key, etc.) are generally well-known, and any known technique may be used by the devices 120 and 122 for communicating the security information described herein. Alternatively, the security information may be provisioned or otherwise stored in the devices 120 and 122 a priori such that each device 120 and 122 is aware of the security information prior to communicating with one another. Yet other techniques for informing each device 120 and 122 of the security information are possible.

As will be described in more detail hereafter, the security information is embedded in the optical signal such that it is effectively hidden from the intrusion device 130. Thus, the intrusion device 130 should be unaware of the presence of the security information in the optical signal and, therefore, fail to embed the security information in the optical signals transmitted by it to the receiver 126. Moreover, the optical communication device 122 is configured to detect the presence of the intrusion device 130 in the fiber path in response to a determination that the receiver 126 has received at least one optical signal missing the security information.

In one exemplary embodiment, the transmitter 125 embeds the security information in the transmitted optical signals using double-modulation techniques as described in U.S. Pat. No. 6,366,373, entitled "Method of Intrinsic Continuous Management Data Transmission in Fiber Optic Communications" and filed on Apr. 2, 2002, and U.S. Pat. No. 7,630,631, entitled "Out-of Band Data Communication between Network Transceivers" and filed on Dec. 8, 2009, which are both incorporated herein by reference. In double modulation, a high-speed data signal defining first data is modulated (e.g., amplitude modulated) with a low-speed data signal defining second data in order to embed the low-speed signal in the high-speed signal. In the instant embodiment, the transmitter 125 amplitude modulates a high-speed signal, referred to hereafter as "payload signal," carrying payload data for the receiver 126 with a low-speed signal, referred to hereafter as "security signal," carrying security information, such as a predefined code word, as shown by block 310 of FIG. 7.

Note that the amplitude modulation of the payload signal is preferably at a level that does not interfere with recovery of the payload data. In this regard, the amplitude modulation of the payload signal affects the amplitude of such signal by a small amount, such as less than about 5 to 10 percent, so that embedding of the security signal in the payload signal does not prevent recovery of payload data from the payload signal. The optical signal transmitted by optical communication device 120 is a double-modulated signal where the payload signal serves as a carrier for the security signal.

Figure 3:
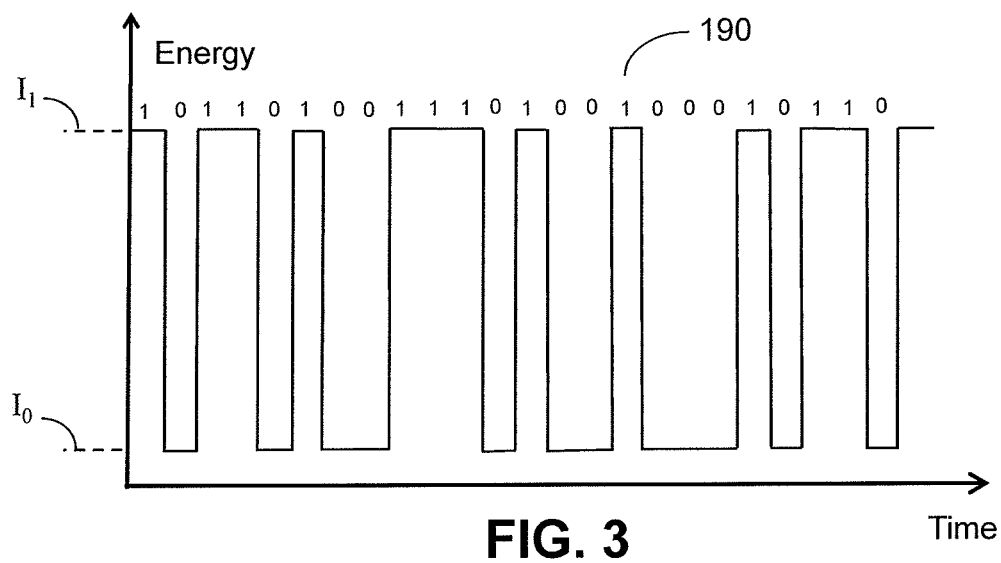
FIG. 3 is a graph illustrating an exemplary payload data signal.
Figure 4:
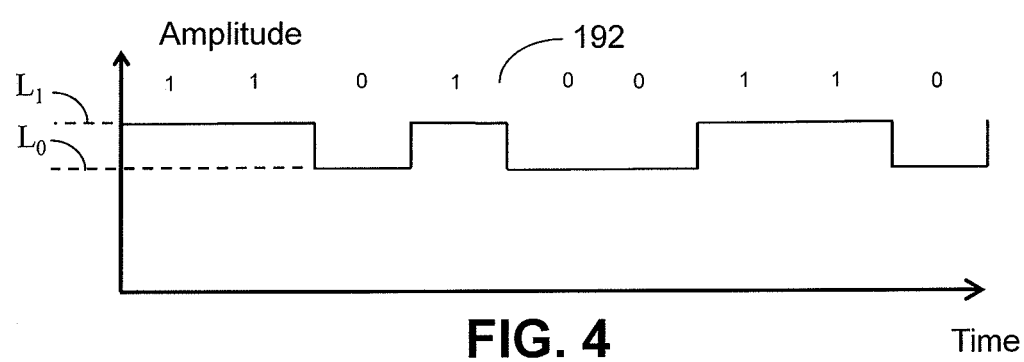
FIG. 4 is a graph illustrating an exemplary security signal.
Figure 5:
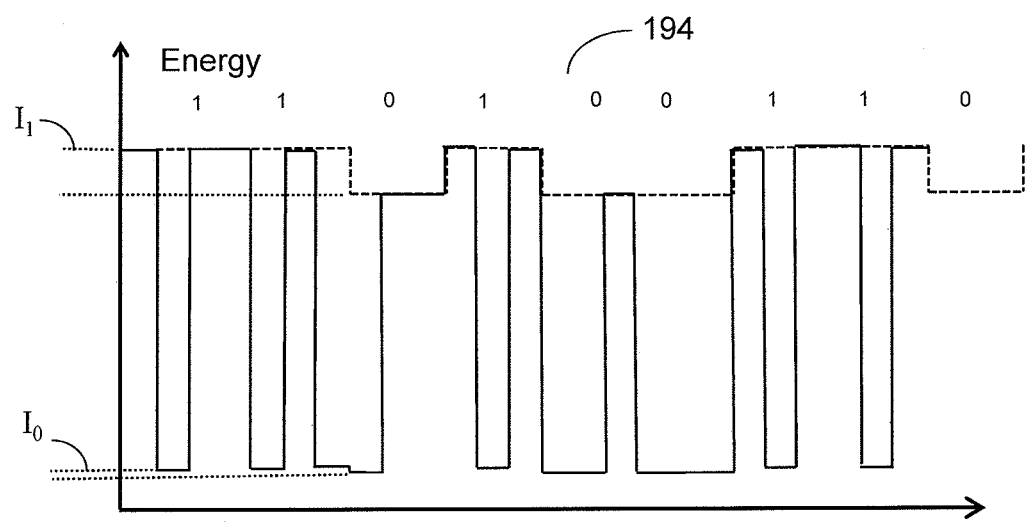
FIG. 5 is a graph illustrating an exemplary signal formed by amplitude modulating the payload signal depicted by FIG. 3 with the security signal depicted by FIG. 4.
Figure 6:
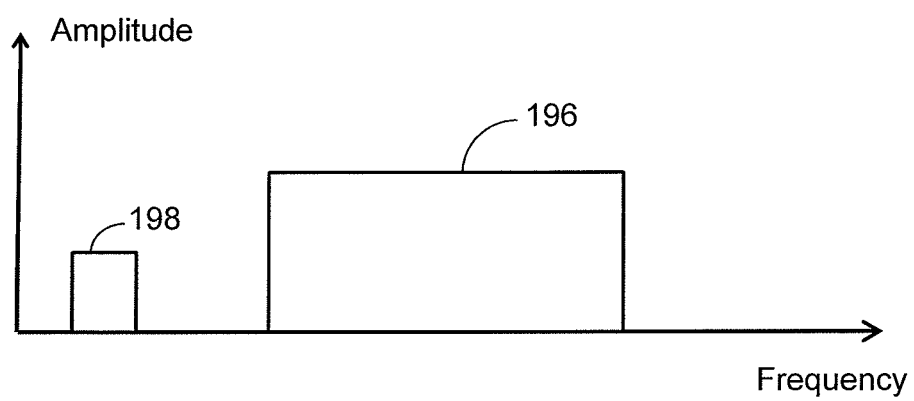
FIG. 6 depicts an exemplary frequency spectrum for the signal of FIG. 5.

To better illustrate the foregoing, refer to FIGS. 3-6. FIG. 3 depicts the time domain characteristics of an exemplary payload signal 190 that transports payload data. The a binary "1" of the payload data is represented by a first power level, $I_1$, and a binary "0" is represented by a second power level, $I_0$. FIG. 4 depicts an exemplary security signal 192. A binary "1" is represented by a first power level, $L_1$, and a binary "0" is represented by a second power level, $L_0$. FIG. 5 shows a representation of the high-speed payload signal 190 amplitude modulated by the security signal 192. The resulting double-modulated signal 194 has four levels of power as depicted in FIG. 5. The energy of the high-speed data signal 190 is in a high-band of frequencies 196 and the security signal 192 has energy in a low-frequency band 198 as depicted in FIG. 6.

Figure 7:
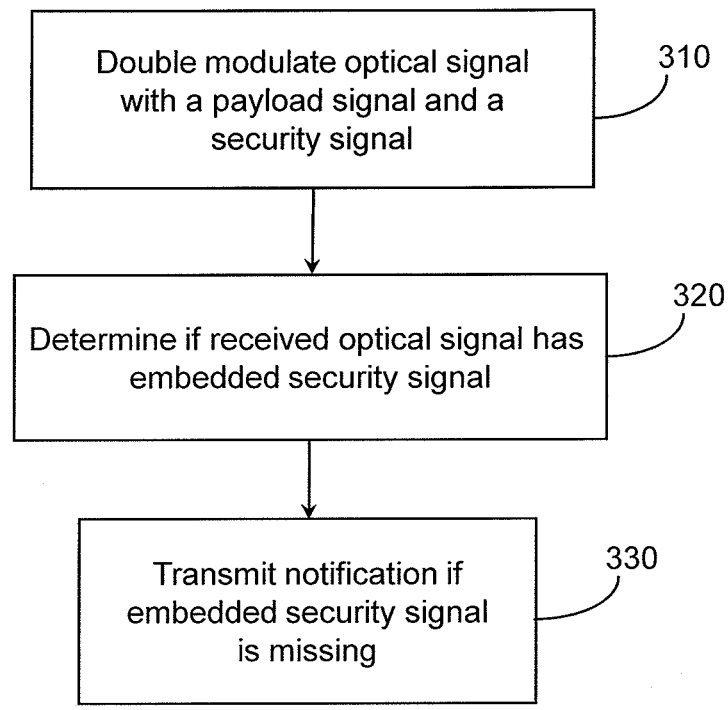
FIG. 7 is a flowchart illustrating an exemplary method of detecting a man-in-the-middle attack on an optical communication system.

Upon receiving an optical signal, the receiver 126 is configured to determine whether such signal has an embedded security signal, as shown by block 320 of FIG. 7. In this regard, referring to FIG. 1, when the intrusion device 130 is not within the fiber path, the receiver 126 of the optical communication device 122 receives the double-modulated optical signal transmitted by the transmitter 125 across optical fiber 140. The receiver 126 is configured to demodulate such double-modulated optical signal to recover the payload signal and the security signal. The payload data defined by the payload data is processed by the optical communication device 122 (e.g., forwarded to the next network node or destination as may be appropriate). The optical communication device 122 is configured to compare the security information defined by the security signal to predefined security information to authenticate the security signal. As an example the security signal may be authenticated if a code word defined by the security signal matches the predefined security information. If the security signal is authenticated, the optical communication device 122 determines that an intrusion device 130 is not present between the devices 120 and 122 and, thus, takes no action to alert a system administrator or other user based on the security information.

However, when the intrusion device 130 is within the fiber path, as shown by FIG. 2, the intrusion device 130 receives the double-modulated optical signal transmitted from the device 120 and converts such signal from the optical domain to the electrical domain. Further, the device 130 stores or otherwise processes data from the electrical signal thereby compromising the security of the system 100. The device 130 then converts the electrical data signal to an optical signal for transmission to the receiver 126. In particular, the device 130 amplitude modulates light based on the electrical data signal. However, since the intrusion device 130 is unaware of the presence of the security signal, the intrusion device 130 does not attempt to embed the security signal in such optical signal. Upon receiving this optical signal, the optical communication device 122 is unable to find and authenticate the security signal. In response to a determination that the expected security signal is not embedded in the received optical signal, the optical communication device 122 detects the presence of the intrusion device 130 and notifies a system administrator or other user about the presence of the intrusion device 130, as shown by block 320 of FIG. 7.

As an example, the optical communication device 122 may transmit a message through the network 150 or otherwise to an address of a system administrator or other user thereby warning the administrator or other user of the presence of the intrusion device 130. In one embodiment, the message identifies the fiber 140 to which the intrusion device 130 is coupled or otherwise indicates the approximate location of the intrusion and/or the data path compromised by the intrusion.

When the device 122 detects the optical intrusion device 130, the device 122 also stops sending data across the fiber 140. For example, the optical communication device 122 may find other paths through the network 150 for messages that otherwise would have been transmitted across the fiber 140, thereby preventing the intrusion device 130 from receiving any further messages from the device 122. Note that the device 120 may be similarly configured to detect the presence of the intrusion device 130 and to stop transmitting messages across the fiber 140 as well.

Figure 8:
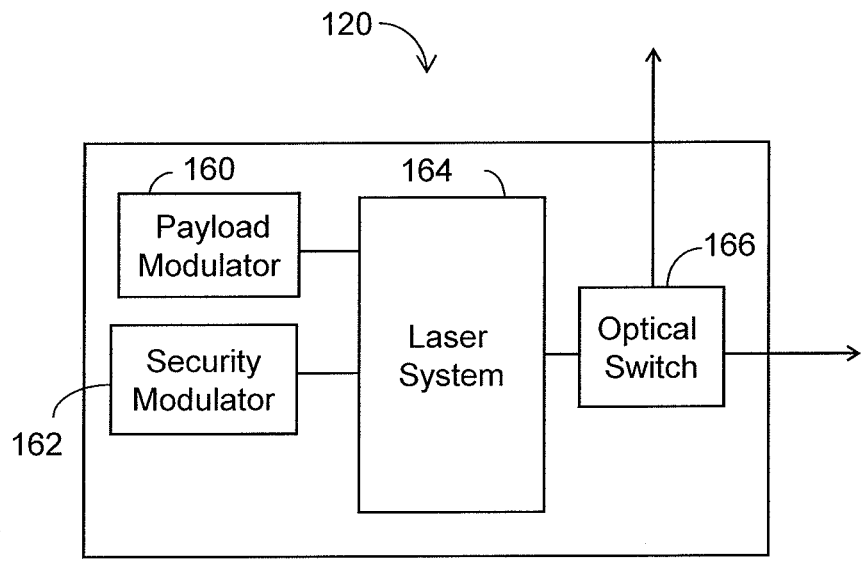
FIG. 8 is a block diagram illustrating an exemplary embodiment of a transmitter, such as is depicted by FIG. 2.

An exemplary embodiment of the transmitter 125 is depicted in FIG. 8. The transmitter 125 comprises a payload modulator 160 and a security modulator 162. The payload modulator 160 receives an electrical payload data signal and conditions the amplitude of such signal so that it is suitable for driving a laser of a laser system 164. The security modulator 162 is configured to generate a security signal and to amplitude modulate the payload data signal with the security signal by a small amount (e.g., less than about 5 to 10 percent) to provide a modulated data signal for driving a laser of the laser system 164. The laser system 164 modulates light based on the modulated data signal thereby providing a double-modulated optical data signal. This signal is "double modulated" in that the data signal used to modulate light by the laser system 164 has previously been modulated by the security modulator 162. The double-modulated optical data signal passes through an optical switch 166 that is coupled to the optical fiber 140.

Figure 9:
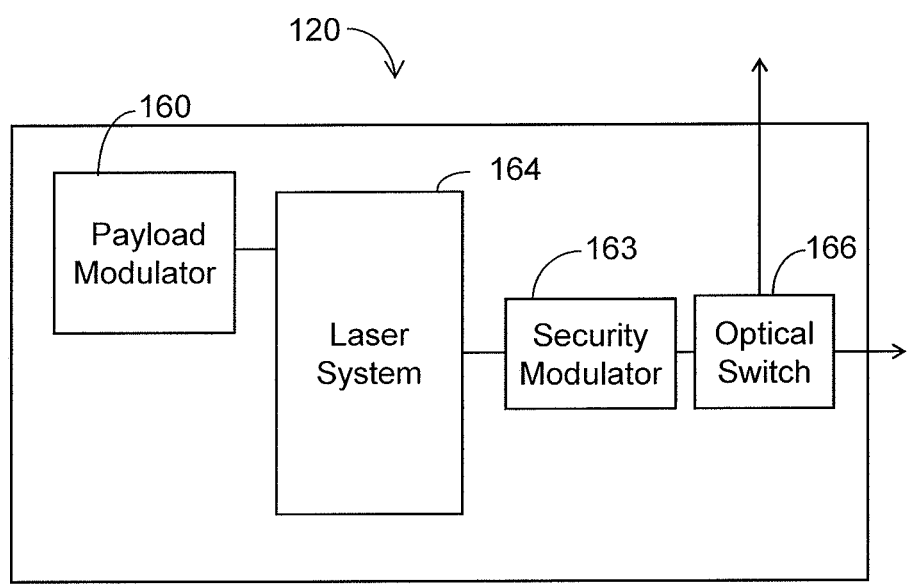
FIG. 9 is a block diagram illustrating another exemplary embodiment of a transmitter, such as is depicted by FIG. 2.

Another exemplary embodiment of the transmitter 125 is depicted in FIG. 9. Similar to the embodiment depicted by FIG. 8, the transmitter 125 of FIG. 9 comprises the payload modulator 160 and the laser system 164. The transmitter 125 further comprises a security modulator 163. The payload modulator 160 receives an electrical payload data signal and conditions the amplitude of such signal so that it is suitable for driving a laser of a laser system 164. The laser system 164 modulates light based on the payload data signal provided by the payload modulator 160 thereby providing an optical data signal. A security modulator 163 is configured to amplitude modulate the intensity of such optical data signal by a small amount (e.g., less than about 5 to 10 percent) thereby providing a double modulated optical data signal. This signal is "double modulated" in that the light has first been modulated by the laser system 164 and then again by the security modulator 163. The output of security modulator 163 is coupled to the optical switch 166.

If the intrusion device 130 is detected, there are various actions that can be taken. As an example, data communication across the optical fiber 140 may be stopped and/or a notification message may be transmitted in response to detection of the intrusion device 130, as described above. In one exemplary embodiment, attempts are made to ascertain the approximate location of the detected intrusion device 130 in an effort to facilitate removal of the intrusion device from the network. In this regard, the optical fiber 140 may span across a significant distance, such as several miles, and a technician may have problems locating the intrusion device 130 without a means to sense its approximate location.

Figure 10:
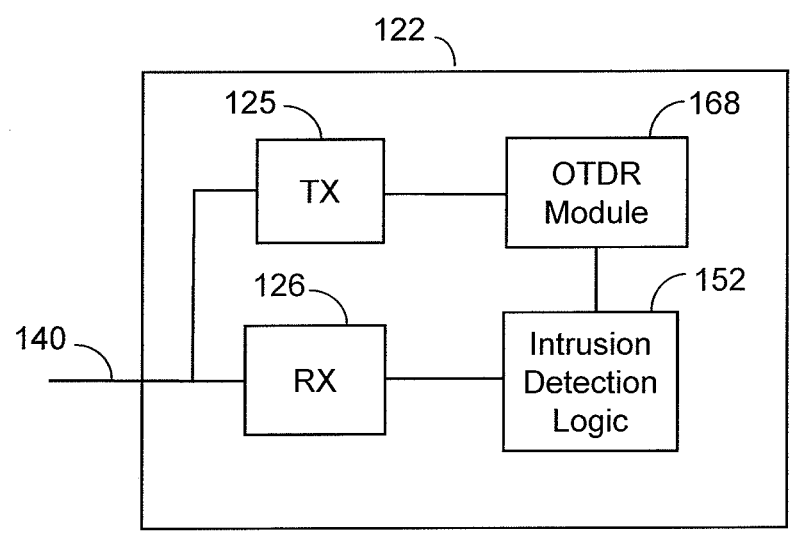
FIG. 10 is a block diagram illustrating an exemplary embodiment of an optical communication device, such as is depicted by FIG. 2.

FIG. 10 depicts an exemplary embodiment of the optical communication device 122, which is configured to sense the approximate location of such intrusion device 130 upon detection of such device 130 based on the security information that is embedded in the payload signal, as described above. As shown by FIG. 10, the device 122 has a receiver 126 configured to receive and demodulate a double-modulated optical data signal to recover a payload signal and a security signal according to the techniques described above. The receiver 126 is configured to provide the security signal to intrusion detection logic 152 that is configured to determine whether an intrusion device 130 is coupled to the fiber 140 between the devices 120 and 122 based on the security signal. Note that the logic 152 may be implemented in hardware, software, firmware, or any combination thereof.

As shown by FIG. 10, the device 122 also comprises a transmitter 125 for transmitting a double-modulated optical data signal to the optical communication device 120 via the fiber 140. The optical communication device 122 further comprises an optical time domain reflectometer (OTDR) module 168. The OTDR module 168 is configured to cause the transmitter 125 to transmit at least one optical sequence or pulse across the fiber 140 and to then analyze the returns of such sequence or pulse. Such OTDR modules have been used in the past in order to detect the location of line anomalies, such as degraded splices, fiber breaks, etc.

In this regard, OTDR modules generally operate on the principle that light is reflected all along the length of the fiber 140, but light is generally reflected more at anomalies than at other points along the fiber 140. By analyzing the returns of a transmitted sequence, it is possible to determine not only the presence of anomalies but also the distance of such anomalies from the transmitter 125. The use of OTDR modules is generally well-known and will not be described in more detail herein. An exemplary OTDR module is described in commonly-assigned U.S. patent application Ser. No. 13/218,204, entitled "Correlation Systems and Methods with Error Compensation" and filed on Aug. 25, 2011, which is incorporated herein by reference. Such patent application describes exemplary techniques for embedding an M sequence in an optical data signal using amplitude modulation similar to the techniques described herein for embedding a low-speed security signal in a high-speed optical data signal.

In one exemplary embodiment, the OTDR module 168 is responsive to a detection of the intrusion device 130 in order to determine its approximate location along the fiber 140. In this regard, if an intrusion device 130 is inserted into the fiber 140, as shown by FIG. 2, then a significant amount of light traveling through the fiber 140 will be reflected at the point of the device 130. Moreover, by analyzing the returns from the fiber 140, the OTDR module 168 is configured to detect the distance of the device 130 from the transmitter 125.

When the intrusion logic 152 detects the presence of the intrusion device 130, as described above, the logic 152 is configured to request the OTDR module 168 to perform an analysis of the fiber 140 in order to determine the distance of the intrusion device 130 from the transmitter 168. In response, the OTDR module 168 is configured to perform such analysis and to provide data indicative of such distance to the logic 152. When the intrusion logic 152 transmits a message notifying the administrator or other user about the presence of the intrusion device 130, such message preferably indicates the location of the intrusion device 130, such as the distance of the intrusion device 130 from the optical communication device 122. Such message also identifies the device 122 and/or indicates the location of the device 122. Thus, by analyzing the message, the user should be able to determine the approximate location of the intrusion device 130.

In another embodiment, the use of the OTDR module 168 is controlled by a system administrator or other user. As an example, the intrusion detection logic 152 may transmit a message via the network 150 or otherwise to a system administrator who may then activate operation of the OTDR module 168 for discovering the location of the instruction device 130. Such system administrator or other user may be at a location remote from the device 122 and communicate with the OTDR module 168 via the network 150 or otherwise in order to control the operation of the OTDR module 168 and/or receive results of the OTDR analysis. Note that the use of the OTDR module 168 is optional, and the OTDR module 136 may be omitted from the optical communication device 122, if desired.

In one exemplary embodiment, the transmitter 125 is configured to frequency modulate the security signal in an effort to better hide the security signal within the transmitted optical signal and/or to help mitigate the effects of noise. In this regard, the transmitter 125 is configured to generate a security signal and to amplitude modulate the payload signal (either in the electrical domain or the optical domain) with the security signal, as described above. Also, as described above, the security signal is modulated with security information, such as a predefined code word, in order to convey the security information. However, rather than amplitude modulating the security signal with the security information in order to convey such information as is described above, the instantaneous frequency of the security signal is varied in order to convey the security information. That is, the security signal is frequency modulated with the security information. In yet other embodiments, other techniques for modulating the security signal with the security information are possible.

Now, therefore, the following is claimed:

1. An optical communication system, comprising:
   a first optical communication device; and
   a second optical communication device coupled to the first optical communication device via an optical fiber, the second optical communication device having a receiver configured to receive from the optical fiber an optical signal transmitted by the first optical communication device, the optical signal comprising a data signal defining data and a security signal embedded in the data signal via amplitude modulation of the data signal, the receiver configured to demodulate the optical signal thereby recovering the data from the data signal and security information from the security signal, wherein the second optical communication device is configured to detect whether an intrusion device is coupled to the optical fiber between the first and second optical communication devices based on the security information, and wherein a power of the security signal is sufficiently less than a power of the data signal such that the amplitude modulation of the data signal with the security signal affects an amplitude of the data signal by less than 10 percent.

2. The system of claim 1, wherein the security signal is frequency modulated with the security information.

3. The system of claim 1, wherein the second optical communication device is configured to transmit a message for warning of a presence of the intrusion device in an optical network in response to detection of the intrusion device.

4. The system of claim 3, wherein the message is indicative of the optical fiber.

5. The system of claim 3, wherein the message is indicative of a location of the intrusion device.

6. The system of claim 1, wherein the second optical communication device has an optical time domain reflectometer (OTDR) module configured to determine a location of the intrusion device along the optical fiber based on returns from the optical fiber.

7. The system of claim 6, wherein the second optical communication device is configured to transmit a message for warning of a presence of the intrusion device in an optical network in response to detection of the intrusion device, and wherein the message comprises data indicative of the location.

8. An optical communication method, comprising:
   receiving from an optical fiber an optical signal comprising a data signal defining data and a security signal embedded in the data signal via amplitude modulation of the data signal, wherein a power of the security signal is sufficiently less than a power of the data signal such that the amplitude modulation of the data signal with the security signal affects an amplitude of the data signal by less than 10 percent;
   demodulating the optical signal thereby recovering the data from the data signal and security information from the security signal; and
   detecting whether an intrusion device is coupled to the optical fiber based on the recovered security information.

9. The method of claim 8, wherein the security signal is frequency modulated with the security information.

10. The method of claim 8, further comprising transmitting a message for warning of a presence of the intrusion device in an optical network in response to detection of the intrusion device.

11. The method of claim 10, wherein the message is indicative of the optical fiber.

12. The method of claim 10, wherein the message is indicative of a location of the intrusion device.

13. The method of claim 8, further comprising estimating a location of the intrusion device along the optical fiber based on returns from the optical fiber.

14. The method of claim 13, further comprising transmitting a message for warning of a presence of the intrusion device in an optical network in response to detection of the intrusion device, wherein the message comprises data indicative of the location.

* * * * *